(12) United States Patent
Poineau et al.

(10) Patent No.: US 6,442,863 B1
(45) Date of Patent: Sep. 3, 2002

(54) TAPE MEASURE ENDPIECE

(75) Inventors: Donald Poineau, New Bedford; Robert A. Martin, Acushnet; James Enos, East Freetown, all of MA (US)

(73) Assignee: T-Hook Associates, New Bedford, MA (US)

( * ) Notice: Subject to any disclaimer, the term of this patent is extended or adjusted under 35 U.S.C. 154(b) by 0 days.

(21) Appl. No.: 09/204,829

(22) Filed: Dec. 3, 1998

Related U.S. Application Data
(60) Provisional application No. 60/093,856, filed on Jul. 23, 1998, and provisional application No. 60/069,158, filed on Dec. 9, 1997.

(51) Int. Cl.⁷ .............................................. G01B 3/10
(52) U.S. Cl. ........................... 33/758; 33/755; 33/760; 33/768; 33/770
(58) Field of Search .......................... 33/758, 755, 757, 33/759, 760, 761, 762, 763, 764, 765, 766, 767, 769, 770, 771, 768

(56) References Cited

U.S. PATENT DOCUMENTS

| RE14,947 E | | 9/1920 | Ballou | |
|---|---|---|---|---|
| 3,036,791 A | * | 5/1962 | Siggelkow | 33/760 |
| 3,913,232 A | | 10/1975 | Marcell | 33/107 |
| 3,913,233 A | | 10/1975 | Marcell | 33/137 |
| 3,965,579 A | | 6/1976 | Woods | 33/137 |
| 4,466,194 A | | 8/1984 | Rutty | 33/137 |
| 4,580,347 A | * | 4/1986 | McKnight | 33/760 |
| 4,930,227 A | * | 6/1990 | Ketchpel | 33/755 |
| 5,010,657 A | | 4/1991 | Knapp | 33/770 |
| 5,172,486 A | | 12/1992 | Waldherr | 33/770 |
| D333,628 S | | 3/1993 | Piotrkowski | D10/74 |
| 5,367,785 A | * | 11/1994 | Benarroch | 33/767 |
| 5,402,583 A | * | 4/1995 | Komura | 33/758 |
| 5,421,100 A | * | 6/1995 | Leore | 33/770 |
| 5,458,946 A | | 10/1995 | White | 428/131 |
| 5,481,813 A | * | 1/1996 | Templeton | 33/758 |
| 5,600,894 A | * | 2/1997 | Blackman et al. | 33/758 |
| 5,659,970 A | | 8/1997 | Reedy | 33/758 |
| 5,720,106 A | * | 2/1998 | Serksnis et al. | 33/394 |
| 5,845,412 A | * | 12/1998 | Arcand | 33/758 |
| 5,894,677 A | * | 4/1999 | Hoffman | 33/758 |
| 6,070,338 A | * | 6/2000 | Garity | 33/760 |
| 6,108,926 A | * | 8/2000 | Fraser et al. | 33/758 |
| 6,115,931 A | * | 9/2000 | Arcand | 33/668 |
| 6,167,635 B1 | * | 1/2001 | Lin | 33/755 |
| 6,223,443 B1 | * | 5/2001 | Jacobs | 33/27.03 |
| 6,349,483 B1 | * | 2/2002 | Dodge, Sr. | 33/758 |

FOREIGN PATENT DOCUMENTS

| GB | 696508 | * 9/1953 | ................. 33/758 |
|---|---|---|---|
| JP | 10030901 | 2/1998 | |

OTHER PUBLICATIONS

Photographs of Sears Craftsman 39217 Tape Measure (No date).

* cited by examiner

Primary Examiner—Diego Gutierrez
Assistant Examiner—Yaritza Guadalupe
(74) Attorney, Agent, or Firm—Kenyon & Kenyon

(57) ABSTRACT

An endpiece for attachment at the end of a tape measure tape. A cross curvature tape measure supports its own weight when it is extended horizontally and is held in an upright position. A perpendicular hook at the end of the tape measure tape can be used to secure the end of the tape measure tape to an edge of an object. A hook that extends above the curved surface of the tape measure tape allows measurements to be secured from below an object while maintaining the upright and self supporting position of the tape. An adhering or magnetic means attached at the end of the tape measure tape further assists in allowing measurements to be taken without causing the incidental collapse of the tape measure tape. Such an endpiece may be removably attached, and may be adapted to fit on existing tape measures.

11 Claims, 7 Drawing Sheets

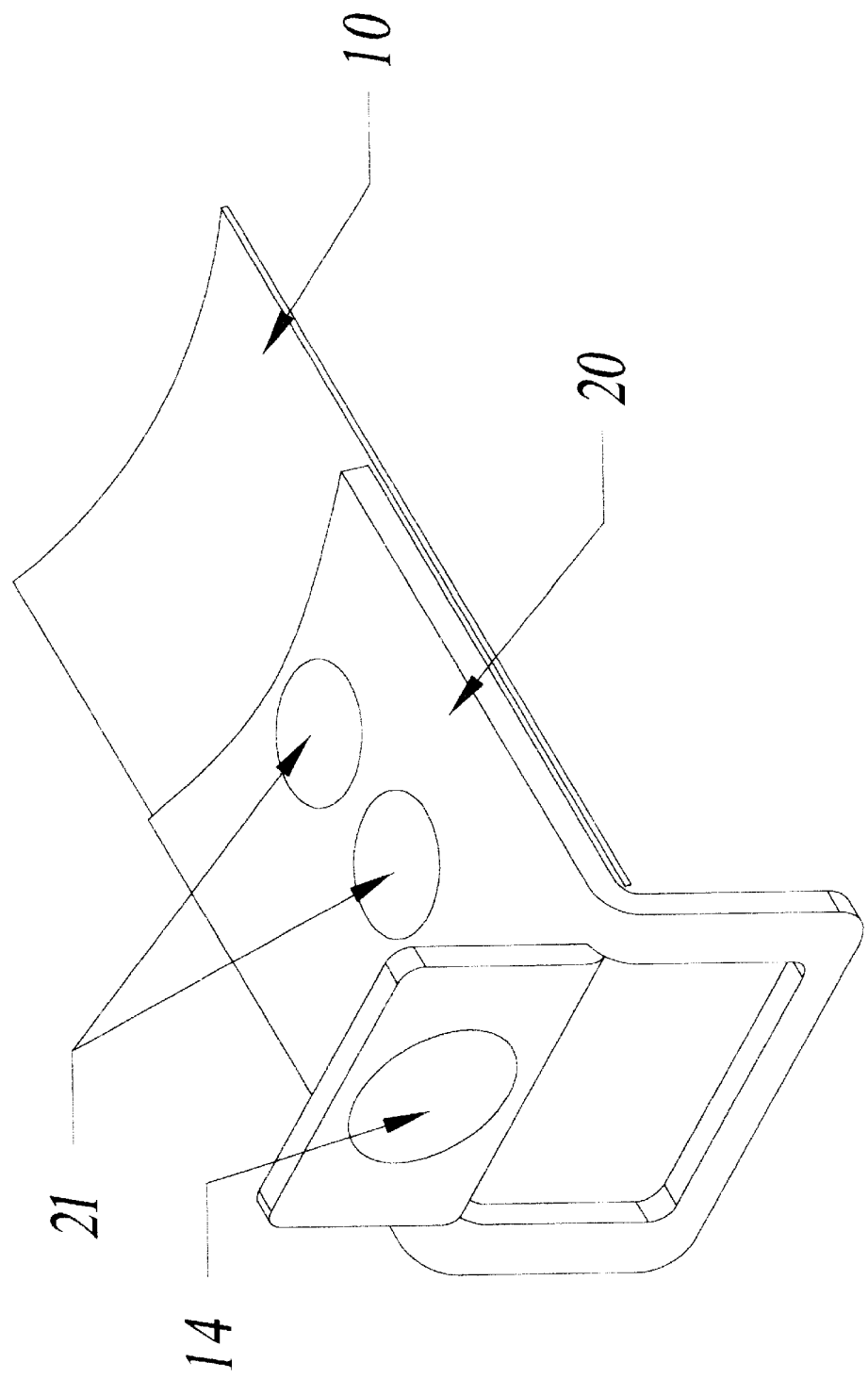

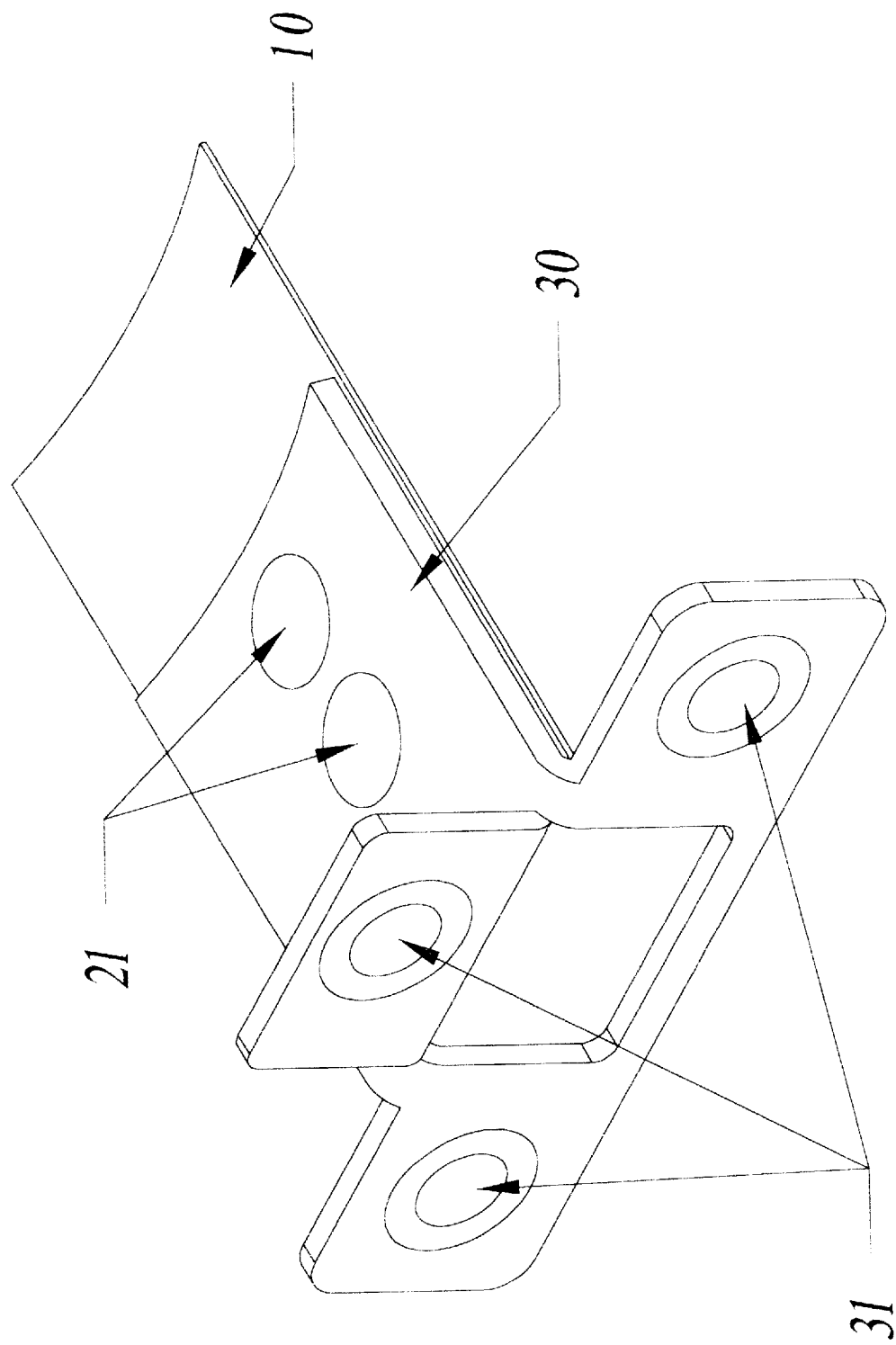

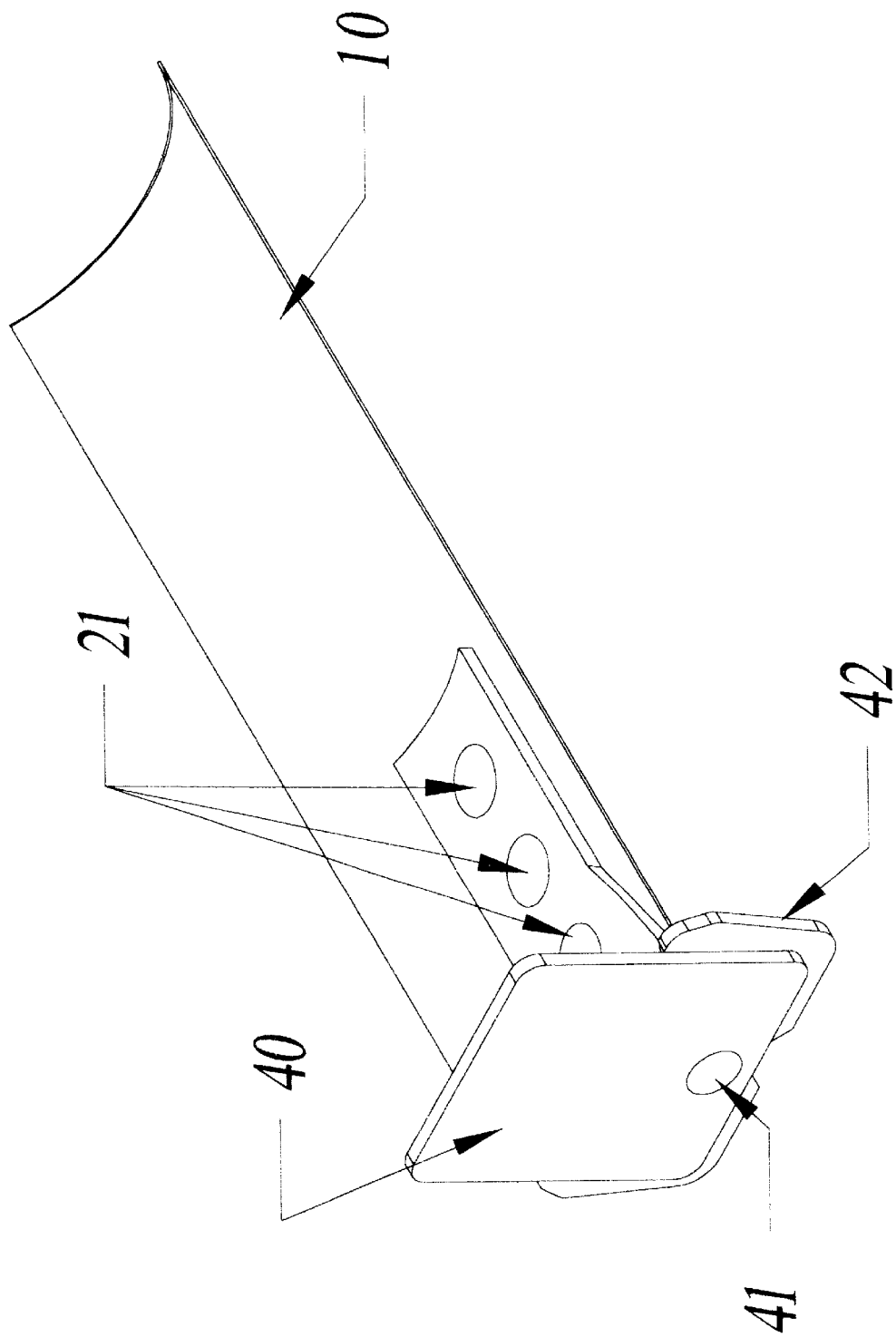

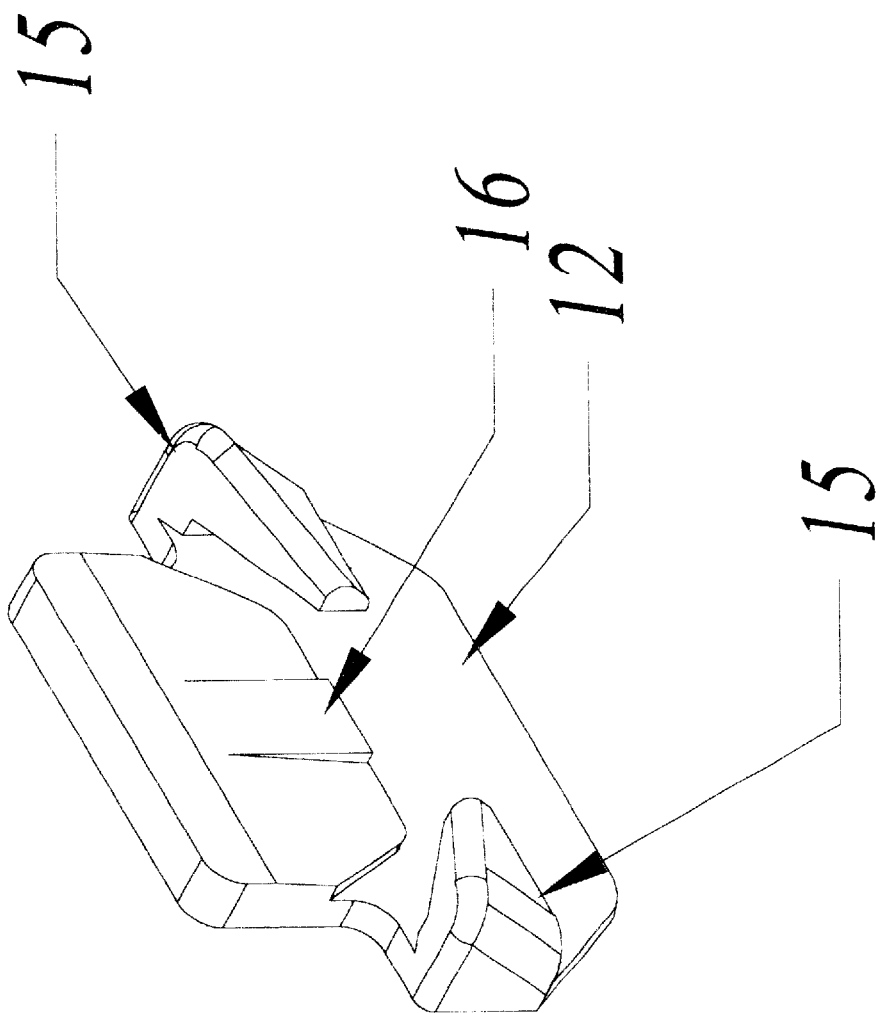

TAPE MEASURE ENDPIECE

Pursuant to 35 U.S.C. §119, this application is based on U.S. provisional application Nos. 60/069,158 and 60/093,856 filed on Dec. 9, 1997, and Jul. 23, 1998 respectively.

FIELD OF THE INVENTION

The present invention relates to an attachment for tape measure devices. More specifically, the present invention relates to an endpiece to be attached at the end of the tape portion of a tape measure tool.

BACKGROUND

Most tape measures utilize a cross curvature tape. Cross curvature tapes are designed with a "U" shaped curvature to allow the tape to remain rigid when it is extended horizontally. The wider the cross curvature tape, the farther it can be extended horizontally and still support its own weight.

With a sufficiently wide cross curvature tape that is held in an upright position, a person can extend the tape horizontally to make a measurement while the tape supports itself. This self supporting property of cross curvature tape allows the user to perform measurements by holding the tape measure in only one hand, or to extend the tape to measure a distance that is out of arms reach. A cross curvature tape that is too narrow across its width may not be suitable for extending horizontally to perform measurements out of arms reach.

When a cross curvature tape is inverted, however, its ability to support itself is very limited. An inverted cross curvature tape will bend and collapse under its own weight after being extended for a short horizontal distance.

Most tape measures are also equipped with an "L" shaped hook at the end of the tape. This "L" shaped hook provides a downward right angle hook at the end of the tape. When measurements are being taken from above an object, the downward right angle hook may be used to hook onto an edge of the object. With this downward right angle hook, the end of the tape is held in position at the edge of the object, eliminating the need for manually holding the end of tape in position. This downward hook can be utilized in conjunction with a cross curvature tape to measure from an object's edge using only one hand, or to measure from an edge of an object that is out of reach.

The downward hook used with a cross curvature tape in existing tape measures presents a problem when the user wishes to hook onto the underside edge of an object. This would occur, for example, when the user is attempting to measure from the underside edge of an overhead object. To hook onto the underside edge of an overhead object with the downward right angle hook, the user would be required to invert the cross curvature tape. The inverted cross curvature tape would then bend and collapse under its own weight if it was extended for more than a short horizontal distance. This bending and collapsing of inverted cross curvature tapes makes it necessary for the user to manually hold the end of the tape measure in place at the underside edge of an object when using an existing tape measure.

The design of existing tape measures includes other functional limitations. Even an upright cross curvature tape cannot remain rigid if it is extended too far. Also if there is no convenient edge to hook onto, or if measurement is desired to be taken from a flat surface, there will be nothing for the downward right angle hook to catch onto. These functional limitations of existing tape measures make it necessary that the end of the tape be held in place by some external means when such measurements are to be performed.

SUMMARY OF THE INVENTION

It is an object of the present invention to provide an endpiece for the tape on a tape measure to overcome the limitations of existing tape measures as described above. More particularly the present invention provides an upward right angle hook at the end of a cross curvature tape which can hook onto an edge on the underside of a work piece without requiring that the cross curvature tape be inverted and without requiring that the end of the tape be held in place manually. The present invention allows a cross curvature tape measure to be extended for significant distances and to stay in place without being held in place by external means. The invention also provides a means for adhering the end of the tape to a surface to prevent an extended tape measure from collapsing and to allow the user to extend the tape from a surface without requiring that the end of the tape be held in place manually. For work done on a metal object this adhering means may be a magnet. Other exemplary adhering means are suction cups, double sided adhesive tape, a sticky adhesive substance like glue or epoxy, or a hook and loop fastening system like Velcro®. The present invention will allow the user to place the end of the tape on an object in a variety of situations without requiring that the end of the tape be held in place by external means.

The endpiece for the present invention may be permanently attached. Such permanent attachment may be achieved in the same manner as the "L" shaped downward hooks that are currently standard for most tape measures.

In an alternative embodiment, the endpiece of the present invention may be removably attached. A removably attachable endpiece has the advantage that existing tape measures may be easily adapted to use the present invention. In the preferred embodiment, the endpiece is designed to be placed onto an existing tape with an "L" shape downward hook. A removably attachable endpiece also has the advantage that the endpiece may be removed in favor of the smaller "L" shaped endpiece in order to work in tight spaces or for easier storage.

BRIEF DESCRIPTION OF THE DRAWINGS

FIG. 4 is a view of a permanently attached embodiment of the invention with hooking surfaces extending in the upward and downward directions. This embodiment also includes a magnetic adhering means on the outer face of the endpiece.

FIG. 5 is a view of a permanently attached embodiment of the invention with hooking surfaces extending upward, downward, and to both sides of the measuring tape. This particular embodiment includes suction cups being used as an adhering means.

FIG. 6 is a view of a permanently attached embodiment of the invention with a rotatable hooking surface which may be rotated in any direction in a plane perpendicular to the axis of the tape.

FIG. 7 is a view of a preferred embodiment of a removably detachable endpiece including a tapered mounting tab 16 for attaching the endpiece to the end of the tape.

DETAILED DESCRIPTION

Figure 1:
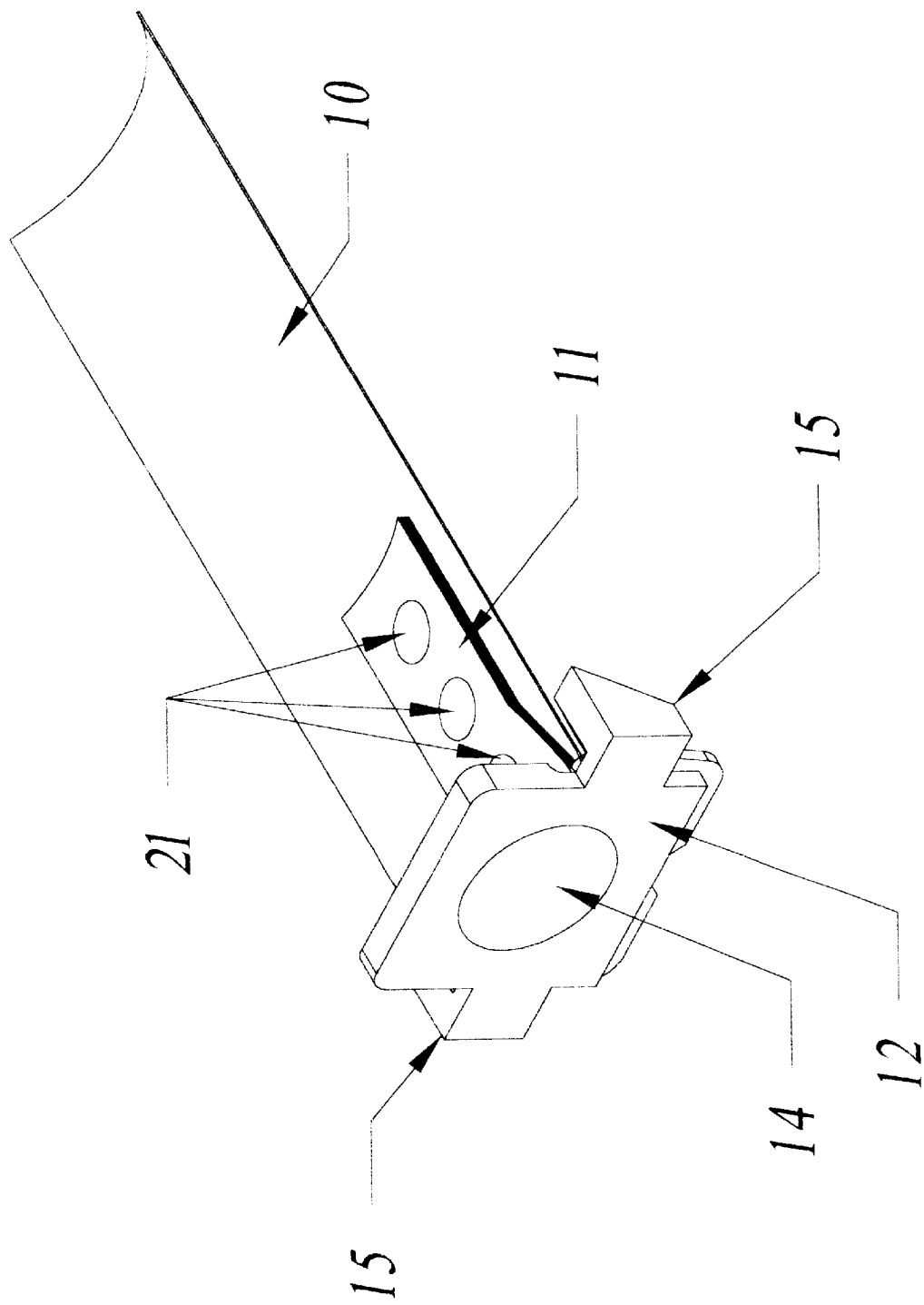
FIG. 1 is a view of a preferred embodiment of a removably attachable endpiece with an upward hooking surface attached to a cross curvature tape with a downward right angle hook. This embodiment also includes a magnetic adhering means attached on the outer face of the endpiece.

In FIG. 1 a removably attachable endpiece 12 is depicted as it attaches to the end of a cross curvature measuring tape 10 with a pre-existing "L" shaped downward hook 11.

The endpiece 12 provides an upward projecting surface which may be used to hook onto the edge of a work piece from below, allowing the user to avoid inverting the cross curvature tape measure, and to avoid having someone else manually holding the end of the tape in place. The downward right angle hook from the original "L" shaped hook can still be used to hook onto the edge of a work piece when measuring from above.

On the outer face of endpiece 12 an adhering means such as magnet 14 may be attached. In a preferred embodiment magnet 14 can be glued into a socket in endpiece 12. Endpiece 12 can be constructed from any suitable material, but in the preferred embodiment it is made from molded plastic.

Figure 2:
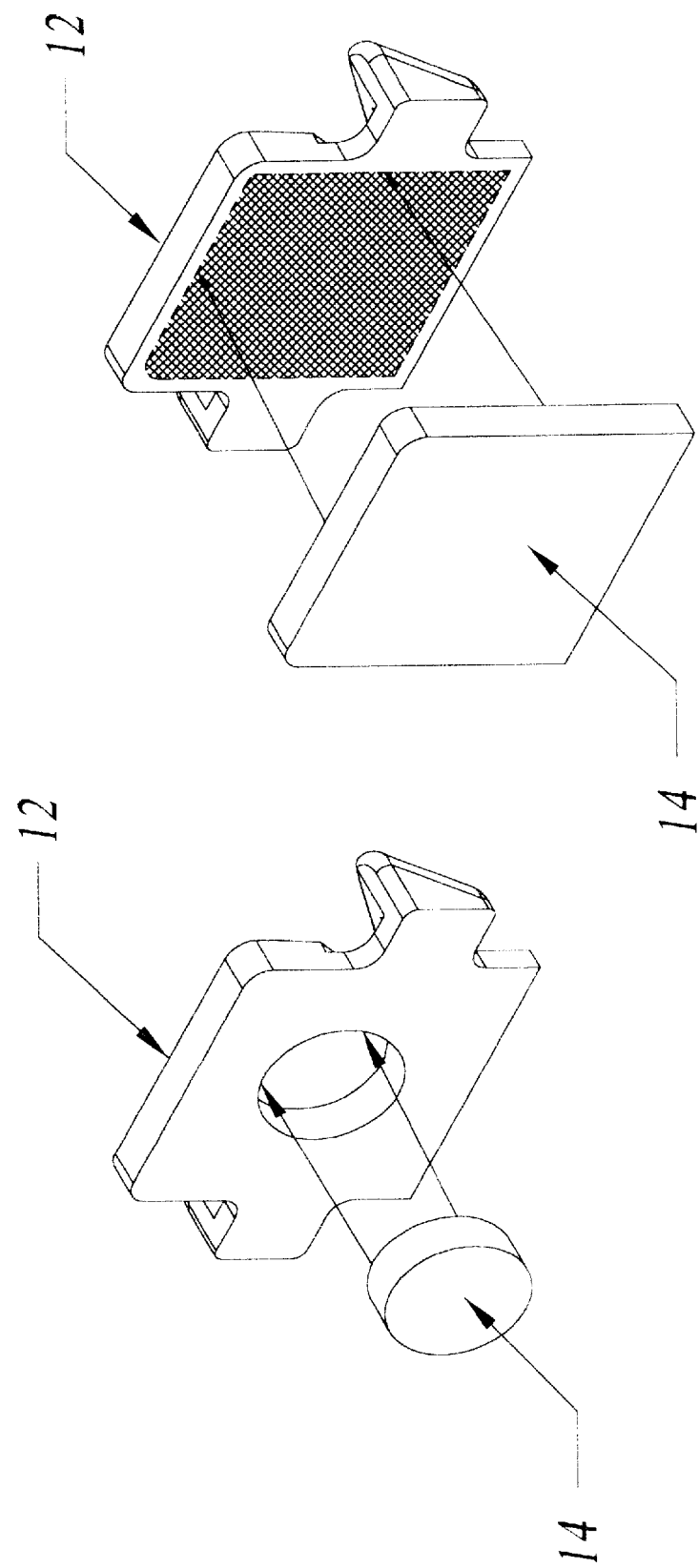
FIG. 2 is a view of some preferred methods for attaching a magnetic adhering means to an endpiece.

Methods for attaching a magnetic adhering means to an endpiece are further depicted in FIG. 2. FIG. 2 shows two exemplary ways that a magnet 14 may be glued to an endpiece. The magnet can be on the outer surface of the endpiece or the inner hooking surface. A magnet may also be positioned on the attaching arms 15 discussed below. The endpiece can even be made entirely from a shaped magnetic material. In a preferred embodiment a rare earth magnet is used to provide a strong adhering means.

Other types of adhering means may be used such as suction cups, double sided adhesive tape, a sticky adhesive like glue or epoxy, or a hook and loop fastening system like Velcro®. By securing these adhering means to the outer surface of the endpiece 12 a user will be able to affix the end of the tape measure to various objects, without having to manually hold the tape end in place, and without having the tape bend and collapse under its own unsupported weight.

The adhering means such as adhesive tape may be attached to the endpiece such that it may be replaced by snapping off old adhering means and snapping on replacements.

Figure 3:
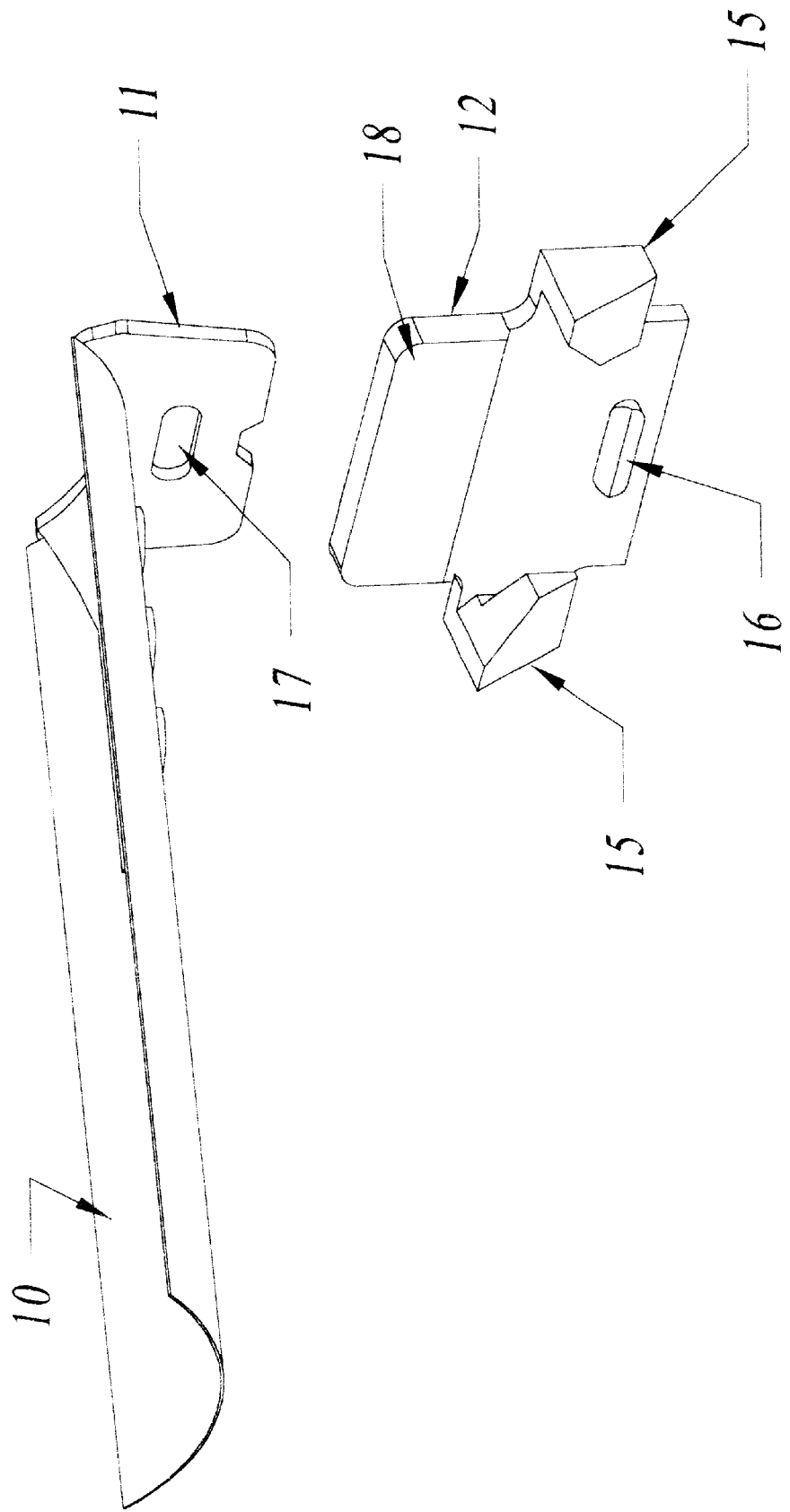
FIG. 3 is another view of the preferred embodiment from FIG. 1, showing details of a preferred means for attaching the removably attachable endpiece.

In FIG. 3 a preferred embodiment for attaching the removable endpiece 12 is depicted. Alternative ways of attaching a removable endpiece include using a friction fit, a snap on, a pinching clip or a clamp arrangement by which the endpiece is secured to the end of the tape measure.

Extending from the vertical sides of endpiece 12 attaching arms 15 form an inserting arrangement to receive and secure the downward right angle hook 11. The downward right angle hook is held in place through a friction fit in the inserting arrangement. In an alternative embodiment, instead of attaching arms, the inserting arrangement may be formed by a single band of material forming a slot to receive the downward right angle hook 11.

Also in the preferred embodiment in FIG. 3, raised mounting tab 16 will catch in the mounting slot 17 of piece 11. Mounting slot 17 is present on most existing tape measure downward hooks. By means of the friction fit in the inserting arrangement and the action of the raised mounting tab catching the edge of the mounting slot 17, the endpiece 12 will be held securely in place.

In the preferred embodiment of FIG. 3, the inserting arrangement for receiving piece 11 should allow the downward hook 11 to be recessed into the body of endpiece 12 in relation to the upper hooking surface 18 of the endpiece 12. A recessed receiving area secures the downward hook 11 to the endpiece 12 since it will be more difficult for the downward hook 11 to slide out.

Also by recessing the insertion of piece 11 to a depth equal to the thickness of piece 11, the upper hooking surface 18 will be on the same plane as the downward hooking surface of piece 11. In this manner there will be no correction to be made for the thickness of piece 11 when taking measurements using the upper hooking surface 18. If a recessed receiving area is not used, measurements taken using the upper hooking surface 18 must be corrected to take into account the thickness of downward hook 11.

FIG. 4 depicts an embodiment of the invention as a permanently attached "T" shaped endpiece 20 with a magnet 14. This permanently attached endpiece may be secured to the end of the tape measure in the same manner that the "L" shaped endpieces are currently attached. For example such existing attachment methods include using metal studs 21. In a preferred embodiment the permanently attached "T" shaped endpiece 20 may be made from stamped metal.

FIG. 5 depicts an alternative embodiment of a four way hooking endpiece 30 with suction cups 31 used as an adhering means. This embodiment includes hooking surfaces extending, above, below, and to either side of the upright tape measure. By extending hooking surfaces laterally to either side of the tape, a user can avoid having to rotate a tape measure 90 degrees on its side in order to hook onto a vertical edge for measurement. In an alternative embodiment, a removable endpiece with hooking surfaces extending in each of these four directions could serve the same purpose.

FIG. 6 depicts an embodiment of the invention where a rotating hooking plate 40 can be rotated about a pivot point 41 to provide a rotatable hooking surface on a plane perpendicular to the axis of the tape. In a preferred embodiment the rotating hooking plate 40 should be attached to the endpiece mounting base 42 by a pivot point pin 41. The pin connection to the rotating hooking plate 40 should be tight enough that the rotating hooking plate 40 will remain in position by friction with the endpiece mounting base 42. Such friction will avoid having the rotating hooking plate 40 swing out of its desired position on its own. As with any of the embodiments described herein, the endpiece mounting base 42 may be permanently or removably attached to the end of the measuring tape.

FIG. 7 depicts a preferred arrangement for the mounting tab 16 to be used to snap into mounting slot 17 to secure a removably attachable endpiece to an existing downward hook on a tape measure tape. In this embodiment mounting tab 16 is tapered to allow the downward hook to slide smoothly into the inserting arrangement while they are being put together. Once the mounting slot 17 clears past the lower lip of mounting tab 16, however, the downward hook will be securely attached to the endpiece.

What is claimed is:

1. A removably attachable endpiece for attachment at a distal end of a measuring tape, the measuring tape having a downward right angle hook at the distal end, said removably attachable endpiece comprising:

an inserting arrangement for receiving the downward right angle hook, the inserting arrangement formed by at least one attaching arm which defines a receiving area for the downward right angle hook, wherein said inserting arrangement further comprises a mounting tab, wherein said mounting tab is positioned to align with a mounting slot in the downward right angle hook.

2. A removably attachable endpiece for attachment at a distal end of a measuring tape, the measuring tape having a downward right angle hook at the distal end, said removably attachable endpiece comprising:

an inserting arrangement for receiving the downward right angle hook, the inserting arrangement formed by at least one attaching arm which defines a receiving area for the downward right angle hook; and an upward vertical hooking surface for hooking onto objects above the tape measure tape; wherein the receiving area defined by the at least one attaching arm is recessed into said endpiece by a predetermined depth that is substantially the thickness of the downward right angle hook to be received in the inserting arrangement.

3. A removably attachable endpiece as in claim 2 wherein said inserting arrangement further comprises:

a mounting tab positioned to align with a mounting slot in the downward right angle hook.

4. The removably attachable endpiece as in claim 2 wherein said inserting arrangement further comprises:

a mounting tab configured to engage with the downward right angle hook.

5. A tape measure comprising:

a cross curvature measuring tape having a distal end and a downward right angle hook at the distal end;

a removably attachable endpiece attached at the distal end of the measuring tape, the endpiece including an inserting arrangement, the inserting arrangement formed by at least one attaching arm defining a receiving area for the downward right angle hook; and a magnet mounted on the endpiece;

wherein the downward right angle hook has a mounting slot and the inserting arrangement further comprises a mounting tab, wherein the mounting tab is positioned to align with the mounting slot in the downward right angle hook.

6. A tape measure comprising:

a cross curvature measuring tape having a distal end and a downward right angle hook at the distal end;

a removably attachable endpiece attached at the distal end of the measuring tape, the endpiece including an inserting arrangement, the inserting arrangement formed by at least one attaching arm defining a receiving area for the downward right angle hook;

a magnet mounted on the endpiece; and an upward vertical hooking surface for hooking onto objects above the tape measure tape, and wherein the receiving area defined by the at least one attaching arm is recessed into said endpiece by a predetermined depth that is substantially the thickness of the downward right angle hook received in the inserting arrangement.

7. The tape measure as in claim 6 wherein the downward right angle hook has a mounting slot,and the inserting arrangement further comprises a mounting tab positioned to align with the mounting slot in the downward right angle hook.

8. The tape measure as in claim 7 wherein the magnet is a rare earth magnet.

9. The tape measure as in claim 6 wherein the inserting arrangement further comprises a mounting tab configured to engage the downward right angle hook.

10. A removably attachable endpiece for attachment at a distal end of a measuring tape, the measuring tape having a downward right angle hook at the distal end, said removably attachable endpiece comprising:

an inserting arrangement for receiving the downward right angle hook, the inserting arrangement formed by at least one attaching arm which defines a receiving area for the downward right angle hook, wherein said inserting arrangement further comprises a mounting tab configured to engage with the downward right angle hook.

11. A tape measure comprising:

a cross curvature measuring tape having a distal end and a downward right angle hook at the distal end;

a removably attachable endpiece attached at the distal end of the measuring tape, the endpiece including an inserting arrangement, the inserting arrangement formed by at least one attaching arm defining a receiving area for the downward right angle hook; and a magnet mounted on the endpiece;

wherein the inserting arrangement further comprises a mounting tab configured to engage with the downward right angle hook.

* * * * *